US008260847B2

(12) United States Patent
Fishman et al.

(10) Patent No.: US 8,260,847 B2
(45) Date of Patent: *Sep. 4, 2012

(54) SYSTEM AND METHOD FOR SCHEDULING AN EVENT OVER A NETWORK

(75) Inventors: Daniel Fishman, Newtonville, MA (US); Charles Connelly, Brighton, MA (US); Jorge Borges, Newton, MA (US); Jorges Sanchez de Lozada, Brighton, MA (US)

(73) Assignee: ACCESS, Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/698,681

(22) Filed: Feb. 2, 2010

(65) Prior Publication Data

US 2010/0138450 A1 Jun. 3, 2010

Related U.S. Application Data

(63) Continuation of application No. 09/872,164, filed on May 31, 2001, now Pat. No. 7,668,900.

(51) Int. Cl.
*G06F 15/16* (2006.01)
(52) U.S. Cl. ............. 709/203; 709/103; 707/104; 705/9
(58) Field of Classification Search .................. 709/103, 709/203; 707/104; 705/9
See application file for complete search history.

(56) References Cited

U.S. PATENT DOCUMENTS

| | | | |
|---|---|---|---|
| 4,977,520 A | 12/1990 | McGaughey, III et al. ... | 364/521 |
| 5,124,912 A | 6/1992 | Hotaling et al. ............. | 364/401 |
| 5,303,145 A | 4/1994 | Griffin et al. ................ | 364/401 |
| 5,727,202 A | 3/1998 | Kucala .......................... | 395/610 |
| 5,774,867 A | 6/1998 | Fitzpatrick et al. ............... | 705/8 |
| 5,790,974 A | 8/1998 | Tognazzini ................... | 701/204 |
| 5,960,406 A | 9/1999 | Rasansky et al. ................. | 705/9 |
| 5,963,913 A | 10/1999 | Henneuse et al. ................ | 705/9 |
| 6,000,000 A | 12/1999 | Hawkins et al. ............. | 707/201 |
| 6,016,478 A | 1/2000 | Zhang et al. ...................... | 705/9 |
| 6,064,977 A | 5/2000 | Haverstock et al. .............. | 705/9 |
| 6,085,205 A | 7/2000 | Peairs et al. .................. | 707/530 |
| 6,101,480 A | 8/2000 | Conmy et al. .................... | 705/9 |
| 6,216,110 B1 | 4/2001 | Silverberg ....................... | 705/9 |

(Continued)

FOREIGN PATENT DOCUMENTS

EP 1 122 672 A2 8/2001

(Continued)

OTHER PUBLICATIONS

Web Team, IBM, "The History of Notes and Domino," *Developer Works Lotus*, Web Team, IBM Dec. 20, 2005.

(Continued)

*Primary Examiner* — Adnan Mirza
(74) *Attorney, Agent, or Firm* — Sunstein Kann Murphy & Timbers LLP (57) ABSTRACT

A method for scheduling an event over a network in a calendar of an invitee includes creating a schedule request that includes at least a set of details of the event and an identifier if the event creator. The schedule request is sent to a server in communication with the network. The server has access to the calendar of the invitee and a calendar for the event creator. Upon receipt of the schedule request, an event record is created at the server that includes at least the set of details for the event and a link to the invitee's calendar. The event is also added to the calendar of the invitee. The schedule request may be created using a link associated with the event.

28 Claims, 6 Drawing Sheets

U.S. PATENT DOCUMENTS

| | | | |
|---|---|---|---|
| 6,226,693 B1 | 5/2001 | Chow et al. | 709/318 |
| 6,269,341 B1 | 7/2001 | Redcay, Jr. | 705/8 |
| 6,313,852 B1 | 11/2001 | Ishizaki et al. | 345/751 |
| 6,339,795 B1 | 1/2002 | Narurkar et al. | 709/246 |
| 6,363,352 B1 | 3/2002 | Dailey et al. | 705/9 |
| 6,366,915 B1 | 4/2002 | Rubert et al. | 707/10 |
| 6,369,840 B1 | 4/2002 | Barnett et al. | 345/853 |
| 6,405,225 B1 | 6/2002 | Apfel et al. | 707/526 |
| 6,577,622 B1 | 6/2003 | Schuster et al. | 370/352 |
| 6,647,370 B1 | 11/2003 | Fu et al. | 705/8 |
| 6,654,800 B1 | 11/2003 | Rieger, III | 709/223 |
| 6,675,356 B1 | 1/2004 | Adler et al. | 715/530 |
| 7,082,402 B2 | 7/2006 | Conmy et al. | 705/8 |
| 2001/0014867 A1 | 8/2001 | Conmy | 705/9 |
| 2002/0032589 A1 | 3/2002 | Shah | 705/6 |
| 2002/0032592 A1 | 3/2002 | Krasnick et al. | 705/8 |

FOREIGN PATENT DOCUMENTS

EP     1 122 672 A3     11/2002

OTHER PUBLICATIONS

Cardone, J., International Search Report; Application No. PCT/US02/16701, dated Jun. 2, 2006.

Thiam, M., Supplementary European Search Report, EP 02 73 4552 (PCT/U502/16701), Sep. 13, 2005.

FIG. 3 www.GOBU.com - Microsoft Internet Explorer

File Edit View Favorites Tools Help

Back  Forward  Stop  Refresh  Home  Search  Favorite  History  Mail  Print  Edit Address: https://gobu.farmerly.com/teams/mt/skedm01.html

Men's Sports
- Basketball
- Crew
- Cross Country
- Golf
- Ice Hockey
- Soccer
- Swimming
- Tennis
- Track Indoor/Outdoor
- Wrestling

Women's Sports
- Basketball
- Crew
- Cross Country
- Field hockey
- Golf
- Lacrosse
- Soccer
- Swimming
- Track Indoor/Outdoor
- Tennis

Links
- BUAA/Team Behind the Teams
- About the Athletic Department
- Facilities
- Promotions/

BOSTON UNIVERSITY
www.gobu.com
Terriers

TotalCast | Ticket Info | Schedule | Staff

*Men's Track Indoor/Outdoor*

2000-01 Men's Indoor Track & Field Schedule

| Date | Teams | Location |
|---|---|---|
| Dec. 2 | Maine, UNH, UMass/Amherst, Providence, Central Connecticut, Bentley — 306 | @ Results — 304 |
| Dec. 9 | Northeastern, Bentley, U. of Albany, Yale, Central Connecticut | @ B.U. Armory |
| Jan. 19 | Terrier Cup Challenge New England Challenge Cup | @ B.U. Armory |
| Jan. 26-27 | Terrier Classic | @ B.U. Armory |
| Feb. 10 | St. Valentine Invitational | @ B.U. Armory |
| Feb. 17 | America East Championship | @ B.U. Armory |
| Feb. 23-24 | New England Championship | @ B.U. Armory |
| March 3-4 | IC-4A Championship | @ Reggie Lewis Center-Boston |
| March 9-10 | NCAA Championship | @ Fayetteville, AR |

SYSTEM AND METHOD FOR SCHEDULING AN EVENT OVER A NETWORK

PRIORITY

This application is a continuation of U.S. patent application Ser. No. 09/872,164, filed May 31, 2001, entitled "System and method for scheduling an event over a network," and naming Daniel Fishman, Charles Connelly, Jorge Borges, and Jorges Sanchez de Lozada as inventors, the disclosure of which is incorporated herein, in its entirety, by reference.

TECHNICAL FIELD

The present invention relates to systems and methods for information management, in particular, scheduling an event over a network, such as the Internet, in a calendar application, such as a personal information management system.

BACKGROUND ART

Personal information managers ("PIMs") are well known in the prior art. PIMs are software applications that are designed to help users organize information such as, for example, calendars or schedules, dates, lists, reminders and contacts and may be implemented on a personal computer or on a personal digital assistant ("PDA"). In addition, PIM's may be implemented as Web sites on the World Wide Web.

SUMMARY OF THE INVENTION

In accordance with one aspect of the invention, a method of scheduling an event over a network in a calendar of an invitee, the event having a set of details provided by an event creator, includes creating a schedule request including at least the set of details and an identifier for the event creator. The schedule request is sent to a server in communication with the network and having access to the calendar of the invitee and a calendar for the event creator. An event record is created at the server that includes at least the set of details and a link to the invitee's calendar. The event is also added to the calendar of the invitee.

In one embodiment, the method further includes creating a link from the event creator's calendar and adding the event to the event creator's calendar. The network may be the Internet. The invitee's calendar, the event creator's calendar and the event record may be stored in a database in communication with the server. The schedule request may be a hypertext transfer protocol request and the invitee's calendar may be part of a personal information management system. In another embodiment, where the event creator changes at least one member of the set of details, the method further includes updating the event record with the changed set of details and updating the event in the invitee's calendar with the changed set of details using the link between event record and the invitee's calendar. A notification message may be sent to the invitee including the changed set of details. In a further embodiment, the schedule request is created using a link associated with the event.

In accordance with another aspect of the invention, a system for scheduling an event over a network in a calendar of an invitee, the event having a set of details provided by an event creator, includes a first link, inserted in a content site associated with the event creator and including the event. When the link is selected, it creates a schedule request including at least the set of details for the event and an identifier of the event creator. At least one server, in communication with the network, receives the schedule request and stores the event in the invitee's calendar and in an event record that includes a second link to the invitee's calendar. At least one database, in communication with the server stores the event record.

In one embodiment, the schedule request is a hypertext transfer protocol request. The event may also be stored in a calendar for the event creator. In another embodiment, the content site is a Web page on the World Wide Web.

Further embodiments of the invention are implemented as a computer program product having a computer useable medium with computer readable program code therein. The computer readable program code may be read and utilized by the computer system in accordance with conventional processes.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

"Invitee" means a user that has selected and scheduled an event in a calendar.

Figure 1:
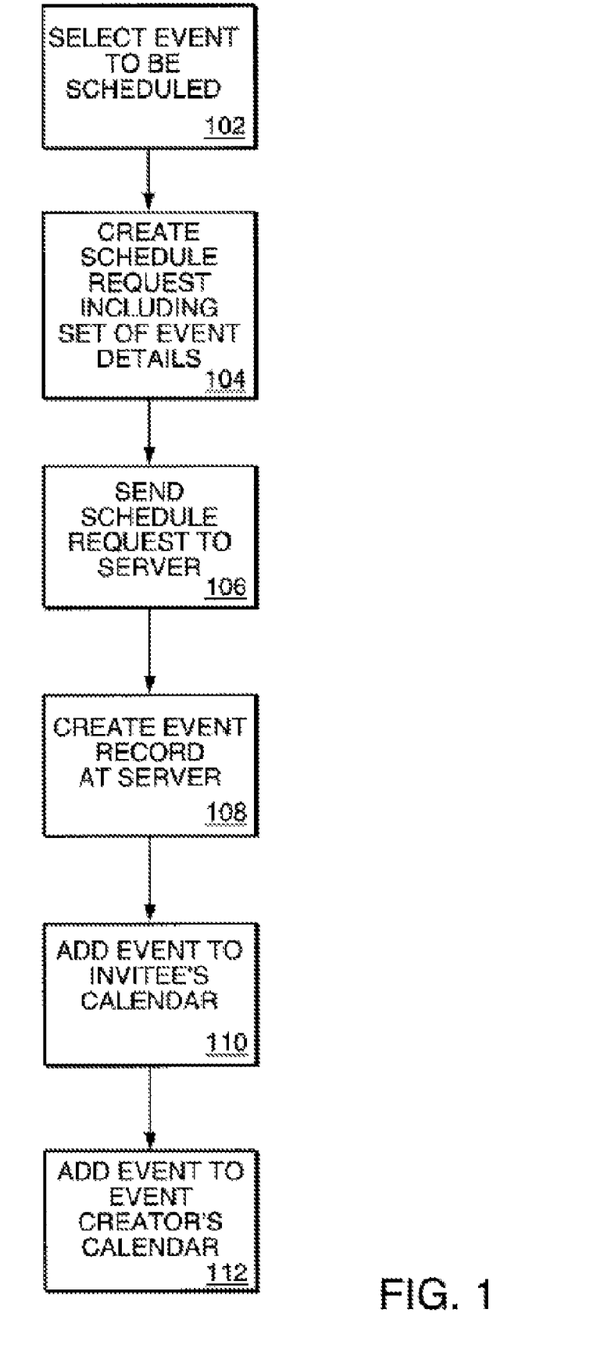
FIG. 1 is a block diagram of the logical flow of a method of scheduling an event over a network in accordance with an embodiment of the invention.

FIG. 1 is a block diagram of the logical flow of a method for scheduling an event over a network in accordance with an embodiment of the invention. At block 102, a user, otherwise referred to herein as an invitee, selects an event to be scheduled in a calendar associated with the user. The user may be, for example, searching for information on the Internet, in particular, the World Wide Web. A plurality of content providers, otherwise referred to herein as an event creator, provide Web sites on the World Wide Web that include event information. An invitee may locate, display and interact with information on the World Wide Web using a Web browser. In accordance with an embodiment of the invention, an event creator provides a link for each event on the Web site. The invitee may then select a link and therefore select the event to be scheduled in the invitee's calendar. The invitee's calendar may be part of, for example, a personal information management system ("PIM"). For more information regarding a Web-based PIM, see co-pending patent application Ser. No. 09/498,516, filed Feb. 2, 2000, and co-pending patent application Ser. No. 09/693,543, filed Oct. 20, 2000, which applications are herein incorporated by reference.

At block 104, when the invitee selects the link associated with a particular event, a schedule request is created that includes a set of details for the event. The schedule request may be, for example, an HTTP (hypertext transfer protocol)

request that includes the set of details for the event. The set of details includes information such as date, time, location, etc. for the event. The schedule request may also include an identifier of the event and an identifier of the event creator. In order to create the schedule request, the event details are parsed using parsing methods known in the art.

At block 106, the schedule request including the set of details is sent to a server that has access to the invitee's calendar and its calendar data as well as a calendar and calendar data for the event creator. Preferably, the calendars and calendar data may be stored in a database in communication with the server. As mentioned above, the invitee's calendar and the event creator's calendar may be part of, for example, a personal information management system.

When the schedule request is sent to the server, the server will need to access the invitee's calendar and calendar data. If the invitee is registered with the system associated with the invitee's calendar, a cookie may be created by the Web browser so that the browser may login to the system without requiring any action by the invitee. A cookie is a mechanism known in the art that allows the Web browser to store information about the user. If the Web browser does not have a cookie with the invitee's login information, the invitee will be presented with a request for login information. Once the invitee provides the requested login information, the server may access the invitee's calendar and calendar data. While the event is scheduled in the invitee's calendar, the invitee will advantageously remain at the location on the Web where the event information was found and may continue searching the Web. If the invitee is not registered with the system, the invitee will be presented with a request to register. When the invitee has registered with the system, a calendar will automatically be created for the invitee and stored in the database. The event creator identifier that is included in the schedule request may be used to identify the event creator and to access the calendar and calendar data for the event creator.

Once the server receives the schedule request, the server will use the event identifier and the event creator identifier to determine if the event is new or has been scheduled before by another invitee. If the event is new (i.e., an event record does not exist), an event record is created for the event at block 108. The set of details for the event are stored in the event record as well as the event identifier and the event creator identifier. The event record may also be stored in a database in communication with the server. At block 110 and 112, a reference to the event is added to the invitee's calendar as well as the event creator's calendar. When the invitee accesses their calendar, they may view the reference to the event that may include information such as the date, time and location of the event. In addition, a link is created from the invitee's calendar to the event record. A link is also created between the event creator's calendar and the event record.

If the event has been scheduled before, then an event record should already exist for the event. The server compares the set of details in the schedule request to the set of details in the event record to determine if the set of details are the same or if a change has been made. If a change to the details of the event has been made, the event record will be updated as well as the calendar of any invitee that had previously scheduled the event prior to the change. The invitees may also be notified of the change using a notification method as discussed below.

The event creator may edit or delete the set of details for the event after an invitee has scheduled the event. Generally, the event creator may edit the event by accessing their calendar as well as changing the event details on the Web site (as discussed above). When a change is made to the event by the event creator at their calendar, the event record is updated as well as the calendar view of each invitee that has scheduled the event and therefore has a calendar with a link to the event record. In this manner, each invitee is notified of any changes to the event without having to reschedule or monitor the status of the event. When an invitee accesses their calendar, the new details of the event may be viewed. In one embodiment, a notification message may also be sent to each invitee including the changes made to the event. The notification message may be an E-mail sent via the Internet.

If the event creator cancels or deletes the event, the link from the event creator's calendar to the event record is deleted and the reference to the event in the event creator's calendar is deleted. A notification message of the cancellation may be sent to each invitee and the link to the event record from each invitee's calendar is removed. The reference to the event in the display of the invitee's calendar is also deleted.

Each invitee may also choose to delete the event from such invitee's calendar, although the event may not be canceled by such invitee for other invitees or the event creator. In this instance, the link from the calendar of the canceling invitee to the event record is deleted while the event record remains.

Once the event has been added to the invitee's calendar, a response may be sent from the server to the Web browser used by the invitee to indicate that the event has been added. For example, a light may appear, or an additional window may appear to indicate a successful addition of the event.

In a further embodiment, an invitee may add the event to a handheld device such as a personal digital assistant (PDA) or cellular telephone. In one embodiment, the handheld device may be a PDA such as the Palm m505 or Palm VIIx provided by Palm, Inc. of Santa Clara, Calif. The invitee's calendar data stored in the database at the server may be added to calendar data on a PDA using synchronization methods known in the art. The PDA may synchronize with the calendar and contact data using a wired connection or through wireless communication for a wireless device.

Figure 2:
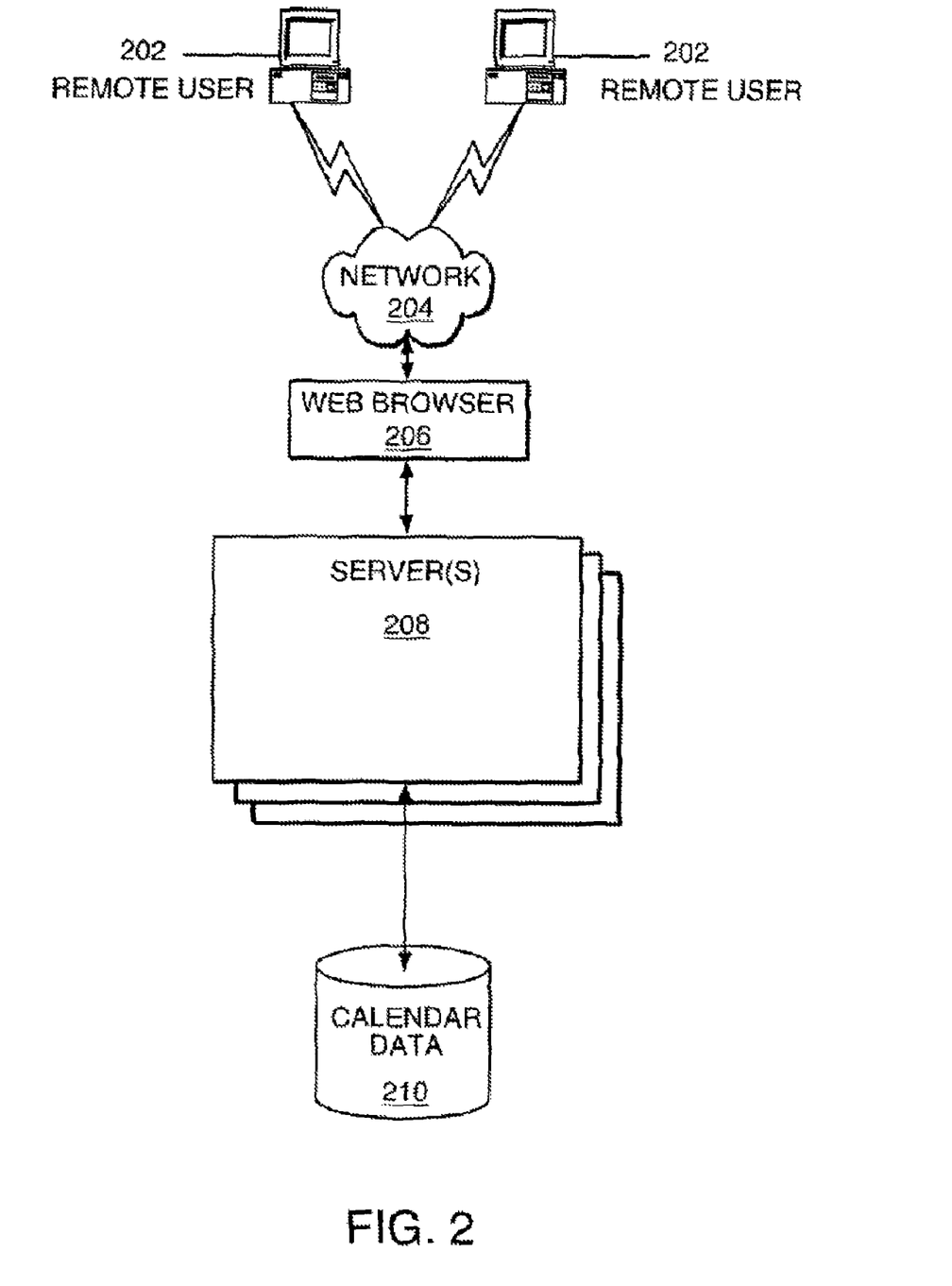
FIG. 2 shows a system for scheduling an event over a network in accordance with an embodiment of the invention.

FIG. 2 shows a system for scheduling an event over a network in accordance with an embodiment of the invention. A user may access the World Wide Web via a remote computer 202 that is in communication over a network 204 with a plurality of servers 208. The network 204 may be implemented as the Internet, in particular, the World Wide Web. Multiple users 202 may access and communicate over the system. The servers 208 are in communication with a database that stores, among other things, calendar and calendar data. The servers 208 may also be in communication with other databases that store the content for Web sites accessible on the World Wide Web. Accordingly, the user (or invitee) may access their calendar as well as other information via sites on the World Wide Web. An invitee may use a Web browser 206 to locate, display and interact with the information on the Web pages on the World Wide Web.

Figure 3:
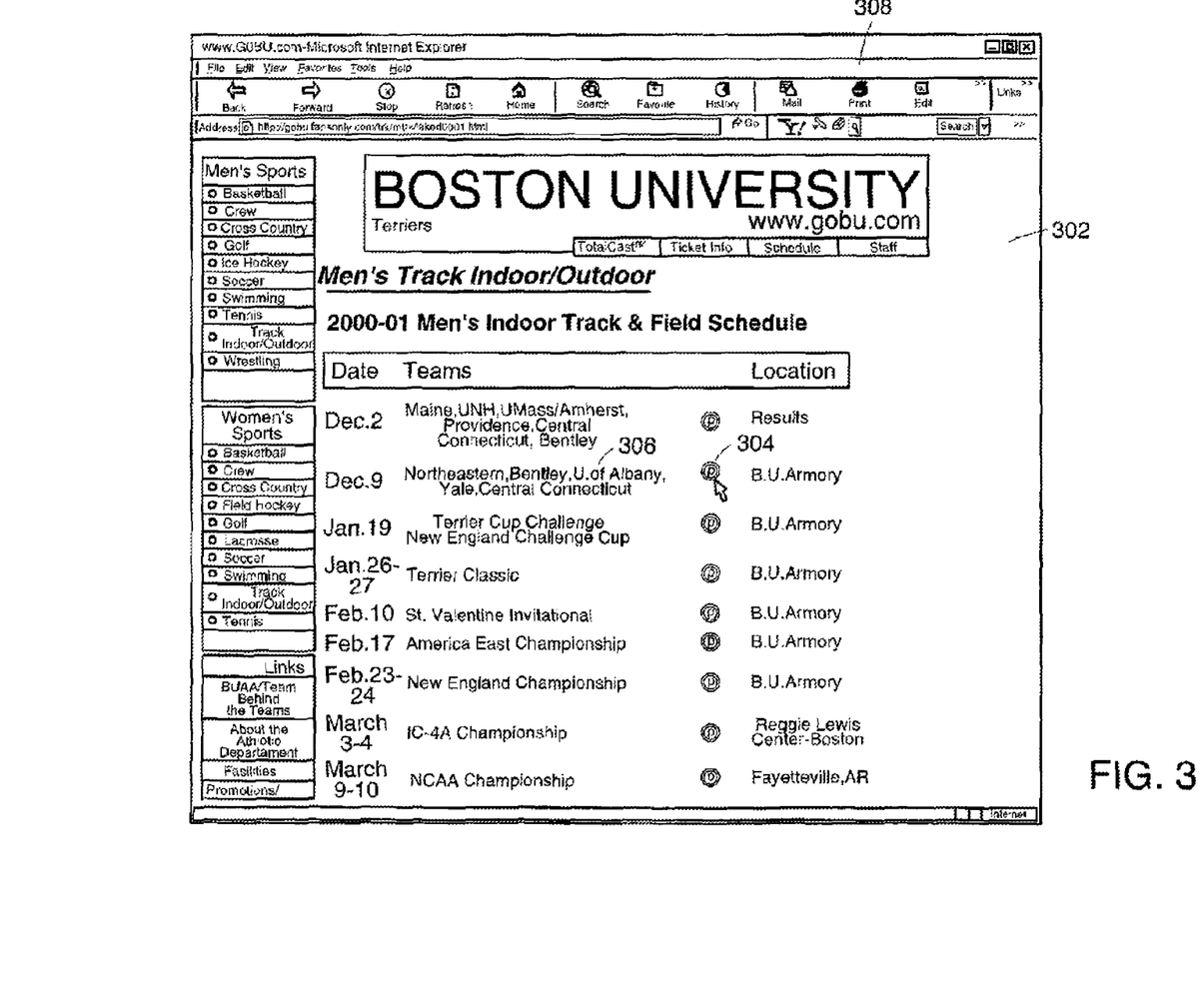
FIG. 3 shows an exemplary content site including a schedule link in accordance with an embodiment of the invention.

FIG. 3 shows an exemplary content site including a schedule link in accordance with an embodiment of the invention. In FIG. 3, a content site 302 is viewed by an invitee using a Web browser 308. The content site 302 includes a number of events the invitee may schedule in their calendar. Accordingly, the event creator has provided a link 304 associated with an event 306 so an invitee may schedule the event 306 in the invitee's calendar. The event creator may provide links for any of the events on the content site 302. To schedule the event, the invitee selects the link 304, which may appear as a graphical button as shown in FIG. 3. The link 304 creates a schedule request including a set of details for the event as well as an event identifier and an event creator identifier. The set of details includes the date, time, location, etc. for the event. Preferably, the schedule request is an HTTP request. An example HTTP schedule request is: <a href="http://www.palm.net/scheduleEvent?name=family_picnic&time=200107041200EST&catgeory=jamesfamily&mypalmid=837293172">Schedule the James family picnic into your calendar!!</a></font> our picnic. In order to create a schedule request, the event details are parsed using parsing methods known in the art.

The schedule request is sent to a server associated with the invitee's calendar as well as a calendar for the event creator. In one embodiment, the calendar and calendar data are stored in a database 210 (shown in FIG. 2) in communication with the server. As discussed previously, the invitee's calendar and the event creator's calendar may be part of a personal information management system. The invitee advantageously continues to view the Web page 302 from which the event 306 was selected while the event is scheduled in the invitee's calendar.

Returning to FIG. 2, when the server 208 receives the schedule request, the server 208 will determine whether the user is logged into the system, such as a PIM, associated with the invitee's calendar. If the Web browser 206 includes a cookie with the invitee's login information, the server 208 will use the cookie information to login to the system and add the event to the invitee's calendar. If the Web browser 206 does not include a cookie with the invitee's login information, or if the invitee is not registered with the system, the invitee will be prompted to login and/or register with the system. The event creator identifier that is included in the schedule request is used to access the calendar and calendar data for the event creator.

Figure 5:
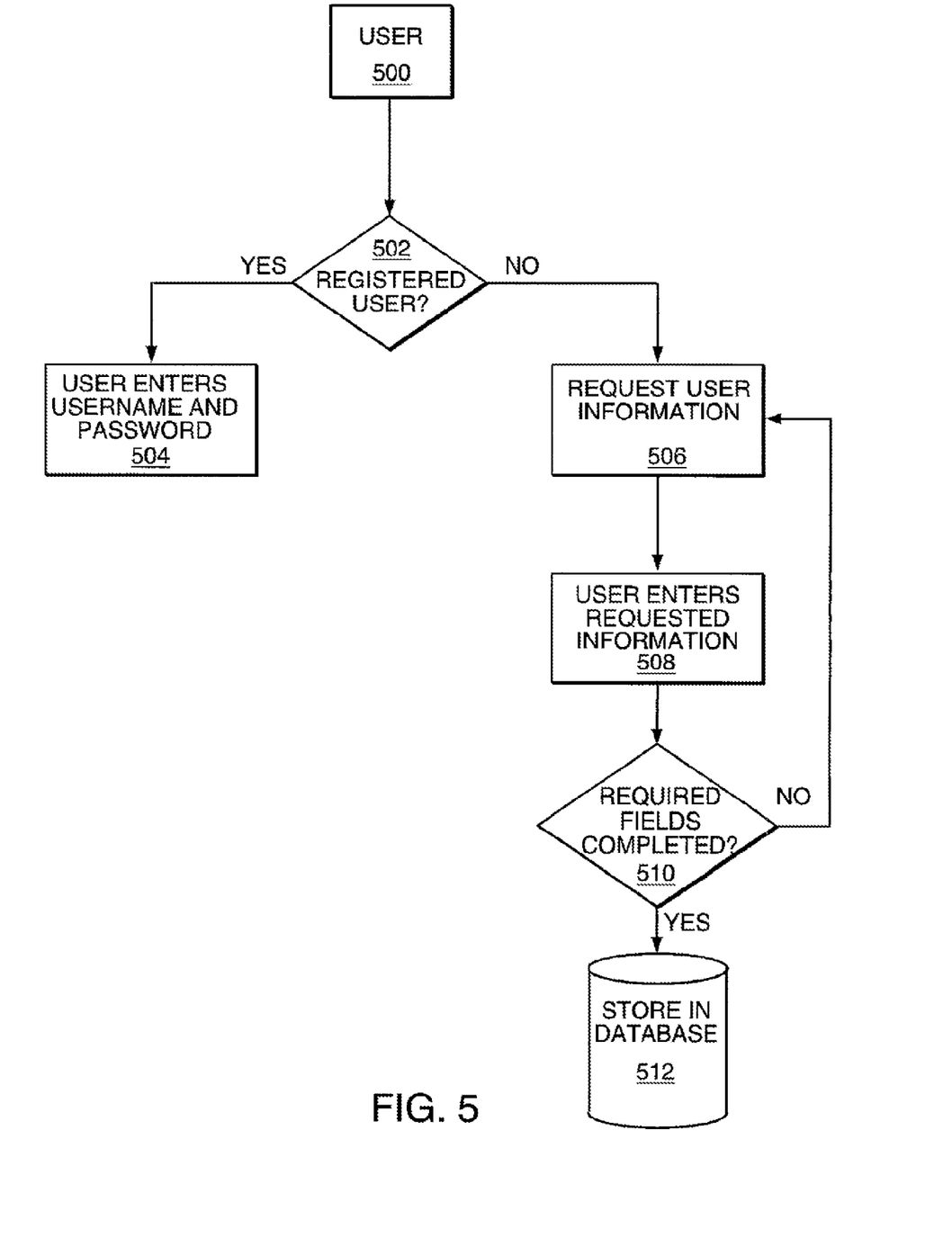
FIG. 5 shows the logical flow of a login and registration process in accordance with an embodiment of the invention.

FIG. 5 is a block diagram of the logical flow of a login and registration process in accordance with an embodiment of the invention. FIG. 5 illustrates the logical flow of a user registration process in accordance with an embodiment of the invention. At block 500, the user is presented with a Web page requesting login or registration information. If the user is a registered user at block 502, then the user will enter their username and password at block 504 to login to the personal information management system. If the user is not a registered user at block 502, the system begins a user registration process at block 506 by requesting registration information from the user. At block 508, the user will provide information such as a name and e-mail address as well as a password and username chosen by the user. If all of the required fields are completed at block 510, then a user account including the information provided by the user is stored in the database at block 512. If the required information is not provided at block 510, then the user registration process will prompt the user for the required information again at block 506.

Figure 4:
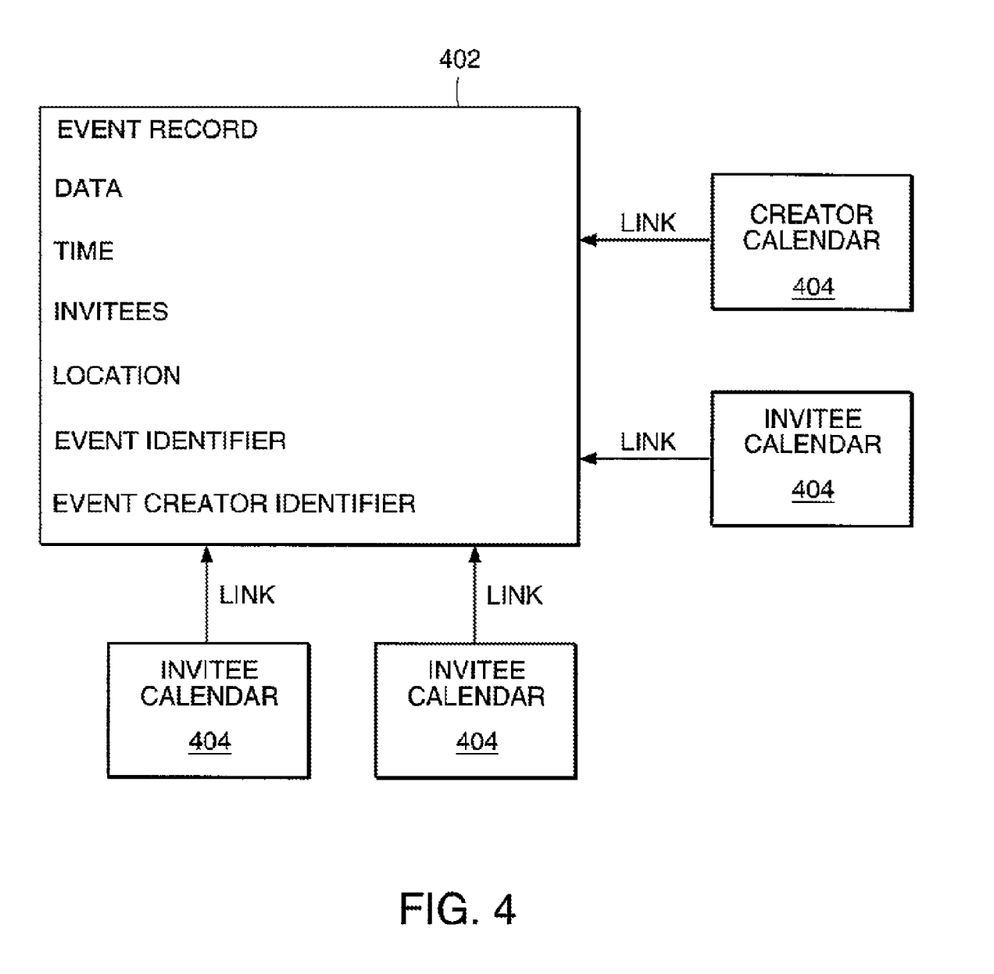
FIG. 4 is a block diagram of an event record in accordance with an embodiment of the invention.

Returning to FIG. 2, once the server accesses the invitee's calendar and calendar data, the event identifier and the event creator identifier may be used to determine if the event is new or has been scheduled before by another invitee. If the event is new (i.e., an event record does not exist), an event record is created for the event and stored at server 208, preferably in a database 210. FIG. 4 is a block diagram of an event record in accordance with an embodiment of the invention. The set of details for the event (e.g., time, location, etc.) are stored in the event record 402 as well as the event identifier and the event creator identifier. In addition, a link is created from the event record 402 to the event creator's calendar 404 and the invitee's calendar 404. Once the event record is created, each time an invitee schedules the event, a link will be created from the event record 402 to the particular invitee's calendar 404.

Figure 6:
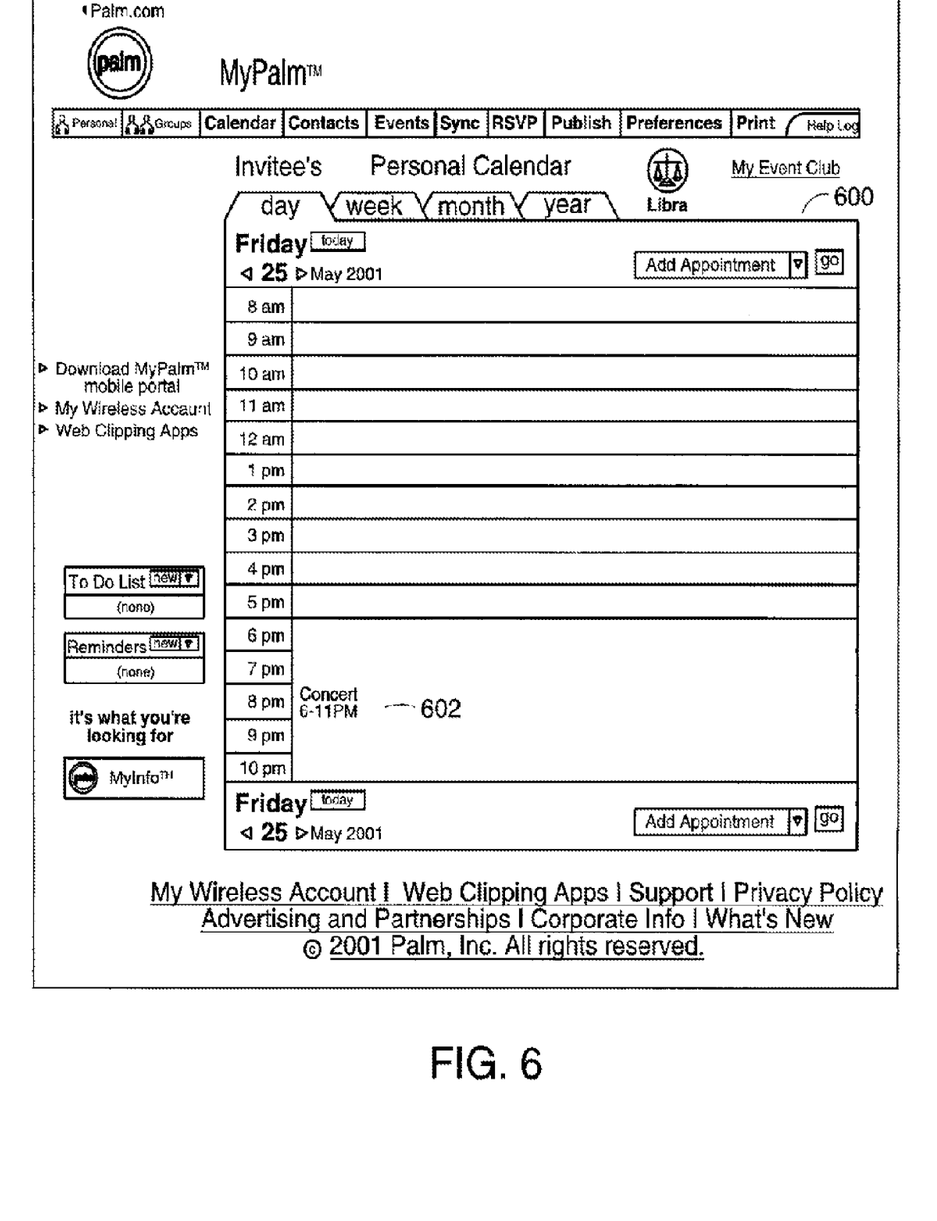
FIG. 6 shows an exemplary calendar view including an event in accordance with an embodiment of the invention.

A reference to the event is also added to the invitee's calendar that shows information such as the date, time, location, etc. of the event. When the invitee accesses their calendar, they will be able to view the reference to the scheduled event 602 as shown in FIG. 6. FIG. 6 shows an exemplary calendar view 600 including a scheduled event 602 in accordance with an embodiment of the invention.

Returning to FIG. 4, if the event has been scheduled before, then an event record 402 should already exist for the event. The set of details in the schedule request are compared to the set of details stored in the event record 402 to determine if a change has been made. If a change has been made to the set of details for the event, the event record 402 will be updated as well as the calendar view of any invitee that had previously scheduled the event. As discussed above with respect to FIG. 2, changes made by the event creator to the event are advantageously automatically updated in each invitee's calendar via the link from the event record to each invitee's calendar.

Returning to FIG. 2, once the event has been added to the invitee's calendar, a response may be sent from the server to the Web browser used by the invitee to indicate that the event has been added. For example, a light may appear, or an additional window may appear to indicate a successful addition of the event.

In a further embodiment, an invitee may add the event to a handheld device such as a personal digital assistant (PDA). The invitee's calendar data stored in the database at the server may be added to calendar data on a PDA using synchronization methods known in the art. The PDA may synchronize with the calendar and contact data using a wired connection or through wireless communication for a wireless device.

Alternative embodiments of the invention may be implemented as a computer program product for use with a computer system. Such implementation may include a series of computer instructions fixed either on a tangible medium, such as a computer readable media, including a non-transitory computer useable medium, (e.g., a diskette, CD-ROM, ROM or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques), the series of computer instructions preferably embodies all or part of the functionality described herein with respect to the system. Those skilled in the art should appreciate that such computer instructions can be written in a number of programming languages for use with many computer architectures or operating systems. Furthermore, such instructions may be stored in any memory device, such as a semiconductor, magnetic, optical or other memory devices, and may be transmitted using any communications technology, such as optical, infrared, microwave or other transmission technologies. It is expected such a computer program product may be distributed as a removable computer program product with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A system for scheduling an event over a network in a calendar of an invitee stored on a computing device, the event having a set of details provided by an event creator, the system comprising:
   a link, inserted in a web page published by the event creator on a web server and including the event, that when selected by the invitee creates a schedule request including at least the set of details for the event, the schedule request directing the event to the invitee's calendar, wherein the selection by the invitee of the link is not preceded by the sending to the invitee of an invitation for the event;
   a scheduling server, in communication with the network and capable of communicating with the computing device, to receive the schedule request; and
   a computing device, containing calendar data of the invitee, in communication with the scheduling server, to synchronize with the schedule request.

2. A system according to claim 1, wherein the schedule request further includes an identifier for the event creator.

3. A system according to claim 1, wherein the scheduling server stores a calendar of the invitee.

4. A system according to claim 3, wherein the scheduling server stores the set of details for the event in the calendar of the invitee.

5. A system according to claim 3, wherein the scheduling server stores the set of details for the event in an event record.

6. A system according to claim 5, wherein the event record further contains a link to the calendar of the invitee.

7. A system according to claim 5, further comprising at least one database, in communication with the scheduling server, to store the event record.

8. A system according to claim 1, wherein the computing device synchronizes with the schedule request using wired communication.

9. A system according to claim 1, wherein the computing device synchronizes with the schedule request through wireless communications.

10. A method for scheduling an event over a network in a calendar of an invitee stored on a computing device, the event having a set of details provided by an event creator, the method comprising:
    as the result of an action by the invitee on a web page published by the event creator, receiving a first schedule request at a scheduling server, such schedule request including at least the set of details, and the scheduling server being capable of communication with the computing device;
    creating an event record at the scheduling server, the event record including at least the set of details; and
    synchronizing the computing device with the set of details from the scheduling server; wherein the action by the invitee on the web page is not preceded by the sending to the invitee of an invitation for the event.

11. A method according to claim 10, wherein the schedule request further includes an identifier for the event creator.

12. A method according to claim 11, wherein the scheduling server has access to a calendar of the event creator.

13. A method according to claim 12, further comprising:
    using the identifier for the event creator to locate the calendar of the event creator; and
    adding the event to the calendar of the event creator.

14. A method according to claim 10, wherein the scheduling server stores a calendar of the invitee.

15. A method according to claim 14, further comprising adding the event to the calendar of the invitee stored by the scheduling server.

16. A method according to claim 14, wherein the event record further includes a link to the calendar of the invitee stored by the scheduling server.

17. A method according to claim 10, wherein the computing device synchronizes with the set of details using a wired connection.

18. A method according to claim 10, wherein the computing device synchronizes with the set of details through wireless communication.

19. A method according to claim 10, further comprising:
    as the result of an action by a second invitee on the web page, receiving a second schedule request at the scheduling server, such second schedule request including an updated set of details for the event;
    locating an event record at the scheduling server that corresponds to the first schedule request;
    updating the event record to include the updated set of details; and
    sending to the computing device a message for synchronizing the event record, causing the computing device to retrieve the updated set of details from the scheduling server.

20. A computer program product for use with a computer system for scheduling an event over a network in a calendar of an invitee stored on a computing device, the event having a set of details provided by an event creator, the computer program product comprising computer readable code embodied in a non-transitory computer useable medium, the computer readable program code comprising:
    program code for receiving a schedule request including at least the set of details at a scheduling server in communication with the network as the result of action by the invitee on a web page published by the event creator, wherein the action by the invitee on the web page is not preceded by the sending to the invitee of an invitation for the event;
    program code for creating an event record at the scheduling server, the event record including at least the set of details; and
    program code for synchronizing the calendar of the invitee stored on the computing device with the event record.

21. A computer program product according to claim 20, wherein the schedule request includes an identifier for the event creator.

22. A computer program product according to claim 21, the computer readable program code further comprising program code for including the identifier for the event creator in the event record.

23. A computer program product according to claim 21, wherein the scheduling server has access to a calendar for the event creator, the computer readable program code further comprising program code for using the identifier for the event creator to locate the calendar for the event creator, and adding the event to the calendar for the event creator.

24. A computer program product according to claim 20, wherein the scheduling server stores a calendar of the invitee.

25. A computer program product according to claim 24, the computer readable program code further comprising program code for adding the event to the calendar of the invitee stored by the scheduling server.

26. A computer program product according to claim 24, the computer readable program code further comprising program code for including in the event record a link to the calendar of the invitee stored by the scheduling server.

27. A computer program product according to claim 20, wherein the program code for synchronizing accesses a wired connection.

28. A computer program product according to claim 20, wherein the program code for synchronizing accesses a wireless connection.

\* \* \* \* \*